(12) United States Patent
Taguchi (10) Patent No.: US 12,055,170 B2
(45) Date of Patent: Aug. 6, 2024

(54) STAPLE AND CONNECTING STAPLE

(71) Applicant: MAX CO., LTD., Tokyo (JP)

(72) Inventor: Satoshi Taguchi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 372 days.

(21) Appl. No.: 17/602,739

(22) PCT Filed: Mar. 17, 2020

(86) PCT No.: PCT/JP2020/011848
§ 371 (c)(1),
(2) Date: Oct. 8, 2021

(87) PCT Pub. No.: WO2020/209019
PCT Pub. Date: Oct. 15, 2020

(65) Prior Publication Data
US 2022/0163058 A1 May 26, 2022

(30) Foreign Application Priority Data

Apr. 9, 2019 (JP) ................. 2019-073949

(51) Int. Cl.
*F16B 15/00* (2006.01)
*F16B 2/26* (2006.01)

(52) U.S. Cl.
CPC ............ *F16B 15/0015* (2013.01); *F16B 2/26* (2013.01)

(58) Field of Classification Search
CPC .......... F16B 2/26; Y10T 24/49; Y10T 24/492; Y10T 24/493; Y10T 24/497; Y10T 24/15
See application file for complete search history.

(56) References Cited

U.S. PATENT DOCUMENTS

| 1,792,235 A | * | 2/1931 | Maynard ................. F16B 15/08 411/443 |
| 3,869,957 A | | 3/1975 | Barth et al. |
| 4,505,273 A | * | 3/1985 | Braun ................. A61B 17/0644 606/221 |
| 5,035,040 A | * | 7/1991 | Kerrigan ................... F16B 2/26 72/409.03 |
| 5,725,554 A | * | 3/1998 | Simon ................. A61B 17/0684 227/19 |
| 5,784,762 A | | 7/1998 | Huntting |

(Continued)

FOREIGN PATENT DOCUMENTS

AT 355855 B 3/1980
DE 19814295 A1 12/1998
(Continued)

OTHER PUBLICATIONS

International Search Report issued in Application No. PCT/JP2020/011848 dated Apr. 21, 2020 (5 pages, with English translation).
(Continued)

*Primary Examiner* — Robert Sandy
(74) *Attorney, Agent, or Firm* — Banner & Witcoff, Ltd.

(57) ABSTRACT

A staple holds and binds two portions on both sides of a cord wound around to-be-bound object. This staple is provided with a pair of leg parts and a crown part connecting the pair of leg parts. The crown part is formed with a mountain portion bent inwardly.

9 Claims, 9 Drawing Sheets

(56) References Cited

U.S. PATENT DOCUMENTS

| | | | |
|---|---|---|---|
| 6,408,489 B1* | 6/2002 | Cluggish | F16B 2/26 |
| | | | 24/703.1 |
| 7,565,780 B2* | 7/2009 | Pinto | B65D 33/1641 |
| | | | 29/243.529 |
| 2007/0098521 A1 | 5/2007 | Zamora | |

FOREIGN PATENT DOCUMENTS

| | | |
|---|---|---|
| FR | 2443197 A1 | 7/1980 |
| JP | 29-7202 Y1 | 6/1954 |
| JP | 60-180530 A | 9/1985 |
| JP | 11-82444 A | 3/1999 |

OTHER PUBLICATIONS

Max Corporation, Product Information 'Induction Binding Machine HR-F for Fruit Trees', 'online', 'Searched on Dec. 26, 2016', the Internet <URL:http://wis.max-ltd.co.jp/agf/product_catalog.html?product_code=HR90010>.

The Written Opinion issued in Application No. PCT/JP2020/011848 dated Apr. 21, 2021 (6 pages with English translation).

Extended European Search Report dated Dec. 2, 2022, issued by the European Patent Office in the corresponding European Patent Application No. 20788093.1. (7 pages).

* cited by examiner

STAPLE AND CONNECTING STAPLE

CROSS REFERENCE TO RELATED APPLICATION

This application is a 35 U.S.C. 371 National Phase Entry Application from PCT/JP2020/011848, filed Mar. 17, 2020, which claims priority to Japanese Patent Application No. JP 2019-073949 filed Apr. 9, 2019, the disclosures of which are incorporated herein in their entirety by reference, and priority is claimed to each of the foregoing.

TECHNICAL FIELD

The present invention relates to a staple and a connecting staple for holding and binding two portions (a first end-side portion and a second end-side portion) on both sides of a cord wound around a to-be-bound object.

BACKGROUND ART

In the related art, in the cultivation of fruit trees such as grapes, an induction binding machine is used so as to induce and grow branches of the fruit tree to a support post and the like (for example, refer to the induction binding machine disclosed in NPL 1).

When performing an induction operation with the induction binding machine, a cord such as a rubber tube is first wound around a to-be-bound object and a staple is struck so as to hold two portions (a first end-side portion of the cord and a second end-side portion on an opposite side to the first end-side portion) on both sides of the cord by the induction binding machine. Thereby, the cord is held and fixed by the staple, so that the to-be-bound object can be bound by the cord.

Figure 9A:
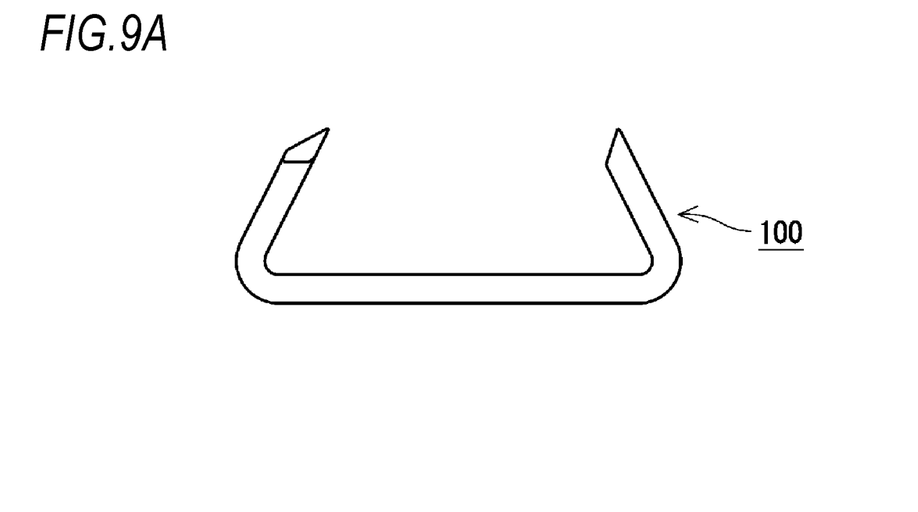
Figure 9B:
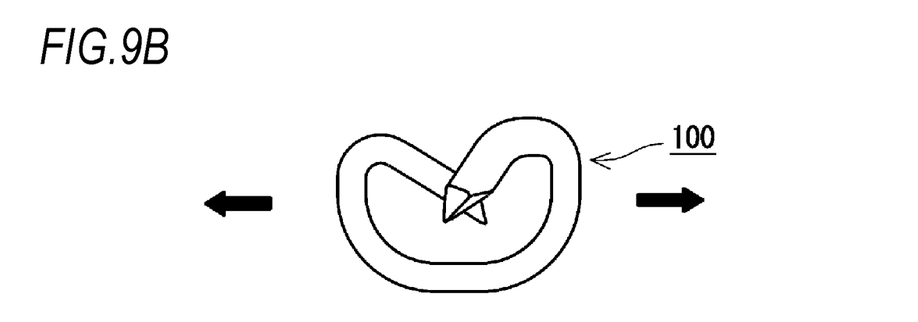
Figure 9C:
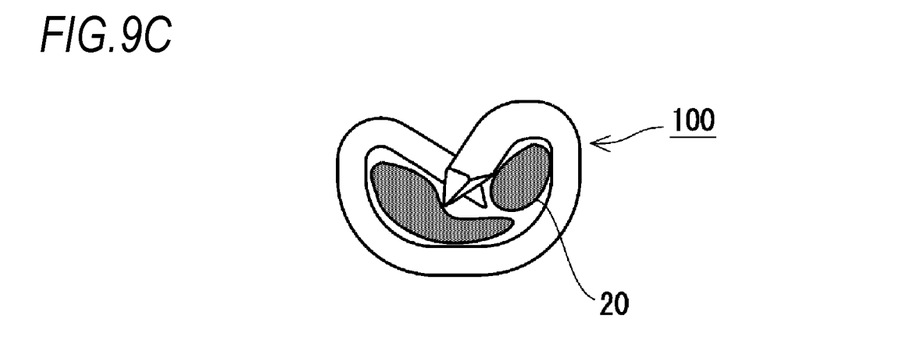

For the induction binding machine of the related art, for example, a staple 100 as shown in FIGS. 9A to 9C is used.

CITATION LIST

Non Patent Literature

[NPL 1] Max Corporation, Product Information 'Induction Binding Machine HR-F for Fruit Trees', 'online', 'Searched on Dec. 26, 2016', the Internet <URL:http://wis.max-ltd.co.jp/agf/product_catalog.html?product_code=HR90010>

SUMMARY OF INVENTION

Technical Problem

However, as shown in FIG. 9B, the staple 100 used for the induction binding machine of the related art is bent in a substantially circular shape to hold the cord 20. For this reason, as shown in FIG. 9C, positions of the two cords 20 held on an inner side of the staple 100 change, so that the cords are not stable. For example, when the clinching is weak or the cords 20 are overlapped over each other to form a gap, the cord 20 may slip and separate from the staple 100. In addition, the cord 20 may be damaged due to burrs of tip ends of the staple 100, and the cord 20 may be disconnected therefrom.

It is therefore an object of the present invention to provide a staple and a connecting staple capable of stabilizing a position of a cord and strongly holding a held cord.

Solution to Problem

The present invention has been made in view of the above situations, and may adopt following configurations, for example.

(1) A staple for holding and binding two portions on both sides of a cord wound around a to-be-bound object, the staple including:
a pair of leg parts and a crown part connecting the pair of leg parts,
wherein the crown part is formed with a mountain portion bent inwardly.

(2) The staple according to (1), wherein the crown part has a first holding portion,
wherein the leg parts have a second holding portion, and
wherein the first holding portion and the second holding portion face each other so as to sandwich the cord.

(3) The staple according to (1), wherein tip ends of the leg parts are provided with introduction portions that are expanded toward tip end directions.

(4) The staple according to (2), wherein tip ends of the leg parts are provided with introduction portions that are expanded toward tip end directions.

(5) The staple according to any one of (1) to (4), wherein the mountain portion is formed by bending a middle portion of the crown part at a right angle or an obtuse angle.

(6) The staple according to any one of (1) to (4), wherein the mountain portion is formed by bending a middle portion of the crown part at an angle of 90° to 130°.

(7) The staple according to (2), wherein the crown part has a pair of the first holding portions,
wherein the pair of leg parts each has the second holding portion,
wherein the pair of the first holding portions of the crown part connects the mountain portion and the pair of leg parts each other, and
wherein the second holding portions of the pair of leg parts continue to the pair of first holding portions of the crown part.

(8) The staple according to (7), wherein a leg-bent portion having a shape bent at an acute angle toward an outer side is provided between the first holding portion and the second holding portion.

(9) The staple according to (8), wherein a curvature radius on an inner side of the leg-bent portion is smaller than a diameter of the cord.

(10) The staple according to (3), wherein the pair of leg parts each has the introduction portion, and
wherein an angle between the introduction portion on one side and the introduction portion on the other side does not exceed 180°.

(11) The staple according to (4), wherein the pair of leg parts each has the introduction portion, and
wherein an angle between the introduction portion on one side and the introduction portion on the other side does not exceed 180°.

(12) The staple according to (2), wherein the crown part has a pair of the first holding portions,
wherein the pair of leg parts each has the second holding portion,
wherein the pair of the first holding portions of the crown part connects the mountain portion and the pair of leg parts each other, and
wherein the second holding portions of the pair of leg parts continue to the pair of first holding portions of the crown part, wherein tip ends of the leg parts are provided with introduction portions that are expanded toward tip end directions, and wherein a tip end-bent portion bent at an obtuse angle toward an inner side is provided between the second holding portion and the introduction portion.

(13) A connecting staple having a plurality of the staples connected to each other according to one of (1) to (12).

Advantageous Effects of Invention

In the configuration of (1), the crown part is provided between the pair of leg parts, and the crown part is formed with the mountain portion bent inwardly. According to this configuration, when binding a cord with the staple, the two cords induced between the pair of leg parts can be separated in two directions. Since the two portions, i.e., the first end-side portion and the second end-side portion on both sides of the cord can be each held by the separate leg parts, the form at the time of the holding is likely to be stable, and the held cord can be strongly held.

In addition, in the configuration of (2), the leg parts and the crown part have the holding portions provided to face each other so as to sandwich the cord. According to this configuration, since the cord can be sandwiched and held by the holding portions, the held cord can be strongly held. For example, in the staple of the related art as shown in FIGS. 9A to 9C, since a large R (bent) shape is formed on an inner side of the staple, a space is likely to be generated between the cord and the staple and the held cord may be thus deformed or moved, so that the holding force is likely to be lowered. However, according to the configuration where the cord is sandwiched by the holding portions facing each other, like the present invention, since a space in which the held cord is deformed or deviates is not generated, a contact load between the staple and the cord does not vary, so that the cord can be strongly held.

In addition, in the configuration of (3), the tip ends of the leg parts are provided with the introduction portions that are expanded toward tip end directions. According to this configuration, when pulling the cord toward the inner side of the staple, the pulling can be facilitated using the introduction portions. In addition, in the staple of the related art as shown in FIGS. 9A to 9C, since the tip ends of the staple are faced inwardly at the time of holding the cord, the cord may be damaged due to burrs or the like of the tip ends of the staple and the cord may be disconnected therefrom. Regarding this, according to the present invention, since the introduction portions are faced outwardly, there is no concern that the held cord is damaged.

Further, in the configuration of (13), it is possible to obtain the connecting state having the plurality of staples connected to each other.

BRIEF DESCRIPTION OF DRAWINGS

FIG. 2 shows a state where a branch of a fruit tree is induced to a support post and the like.

FIGS. 3A, 3B and 3C shows a relationship between a staple and a cord before binding, in which

FIGS. 4A, 4B and 4C shows the relationship between the staple and the cord after binding, in which

FIGS. 5A and 5B shows a relationship among the staple, the cord and a to-be-bound object after binding, in which

FIGS. 6A and 6B shows the relationship among the staple, the cord and the to-be-bound object after binding, in which

FIGS. 7A and 7B are front views of a staple where an angle of introduction portions is made large, in which FIG. 7A shows the staple before binding and FIG. 7B shows the staple after binding.

FIGS. 9A, 9B and 9C are front views of a staple according to the related art, in which FIG. 9A shows the staple before binding, FIG. 9B shows the staple after binding, and FIG. 9C shows a state where a cord is held after binding.

DESCRIPTION OF EMBODIMENTS

Embodiments of the present invention will be described with reference to the drawings.

A staple 10 according to the present embodiment is to hold and bind two portions (a first end-side portion 20a of a cord 20 and a second end-side portion 20b on an opposite side to the first end-side portion 20a) on both sides of a cord 20 wound around a to-be-bound object. The first end-side portion 20a is a portion closer to one end-side than a middle portion of the cord 20 wound around the to-be-bound object, and the second end-side portion 20b is a portion closer to the other end-side than the middle portion of the cord 20 wound around the to-be-bound object.

Figure 2:
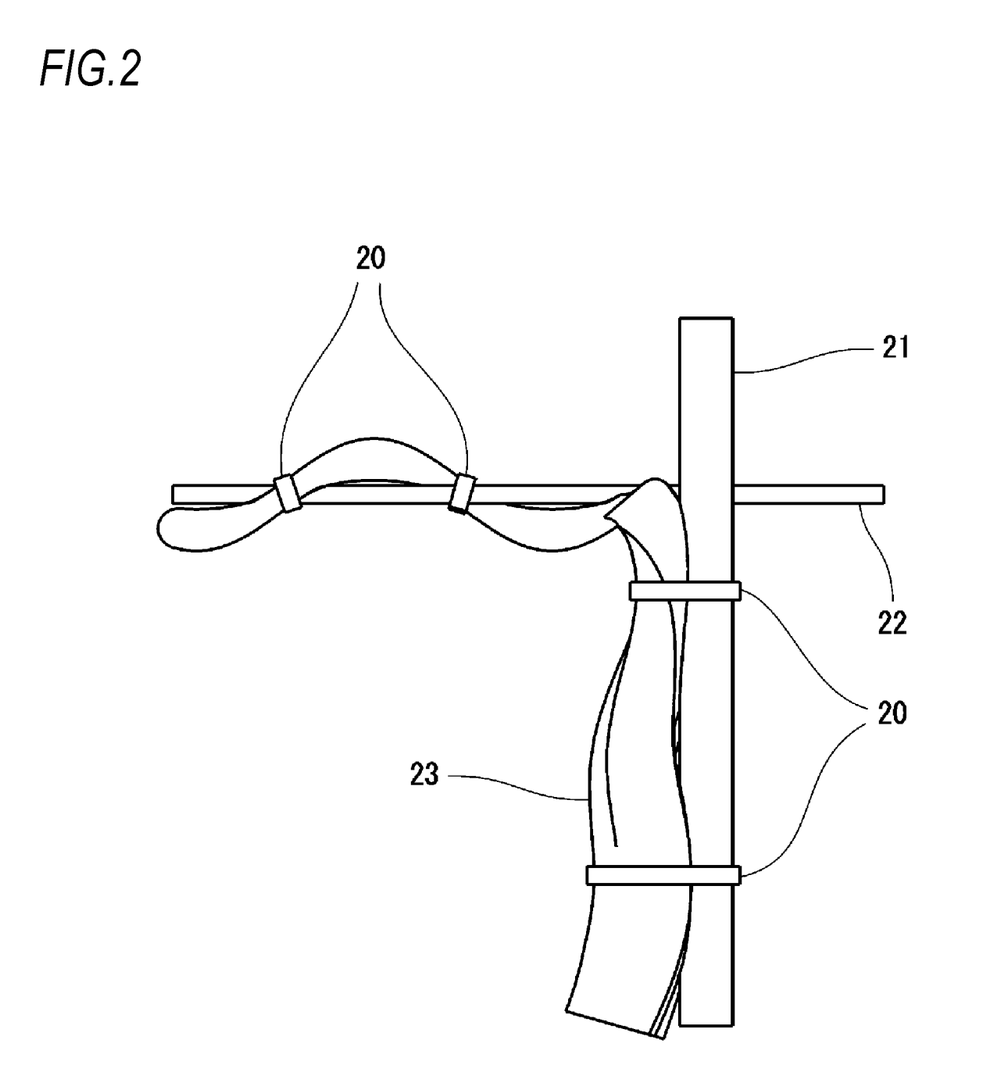

The staple 10 is used for an induction operation in the cultivation of fruit trees such as grapes, for example. Specifically, as shown in FIG. 2, in order to induce and grow a branch 23 of a fruit tree to a support post 21, a wire 22 and the like, the staple 10 is used mounted on an induction binding machine (not shown).

Figure 5A:
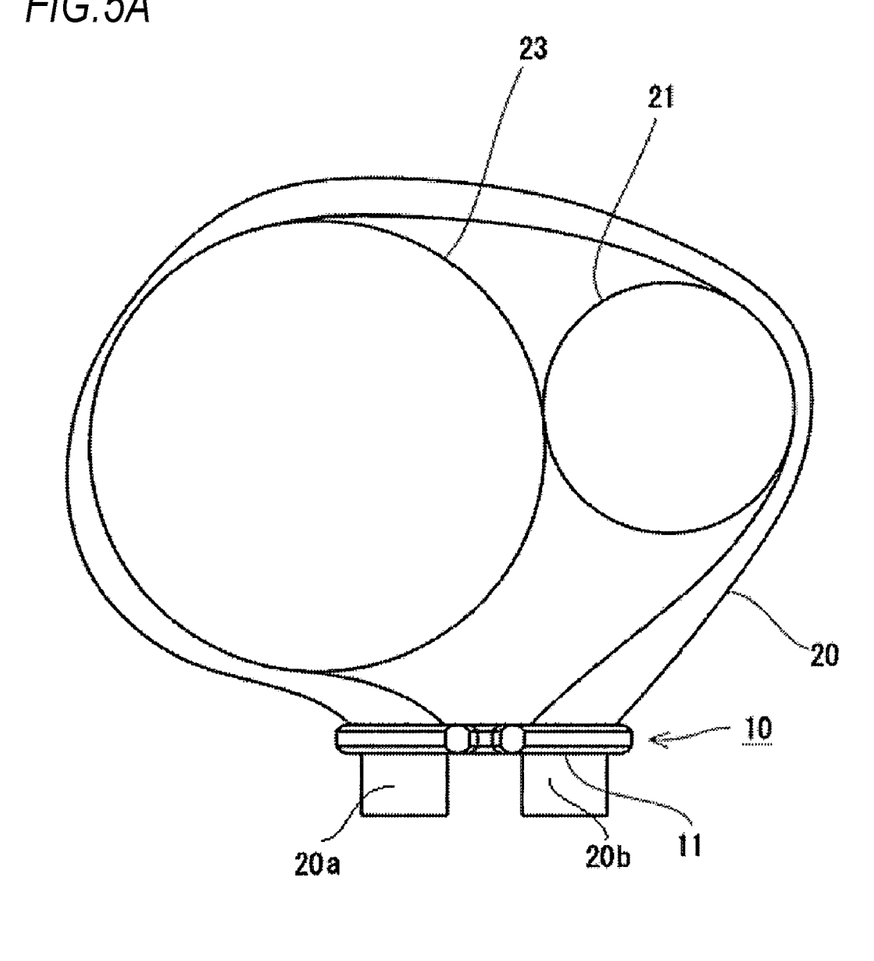
FIG. 5A is a plan view.
Figure 5B:
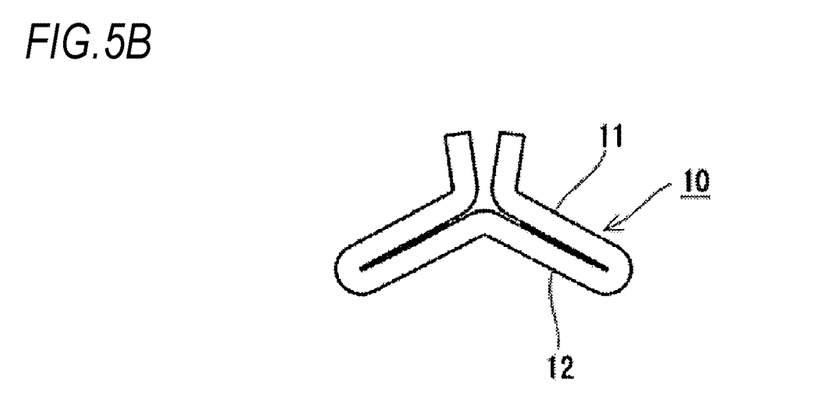
FIG. 5B is a front view of only the staple.

When performing the induction operation, a plurality of to-be-bound objects (the branch 23, the support post 21, the wire 22 and the like) is first bundled and wound with the cord 20 such as a rubber tube, and the staple 10 is struck using the induction binding machine so as to hold the two portions (the first end-side portion 20a and the second end-side portion 20b) on both sides of the cord 20. Then, as shown in FIGS. 5A and 5B, the cord 20 is held and bound by the staple 10.

Figure 1:
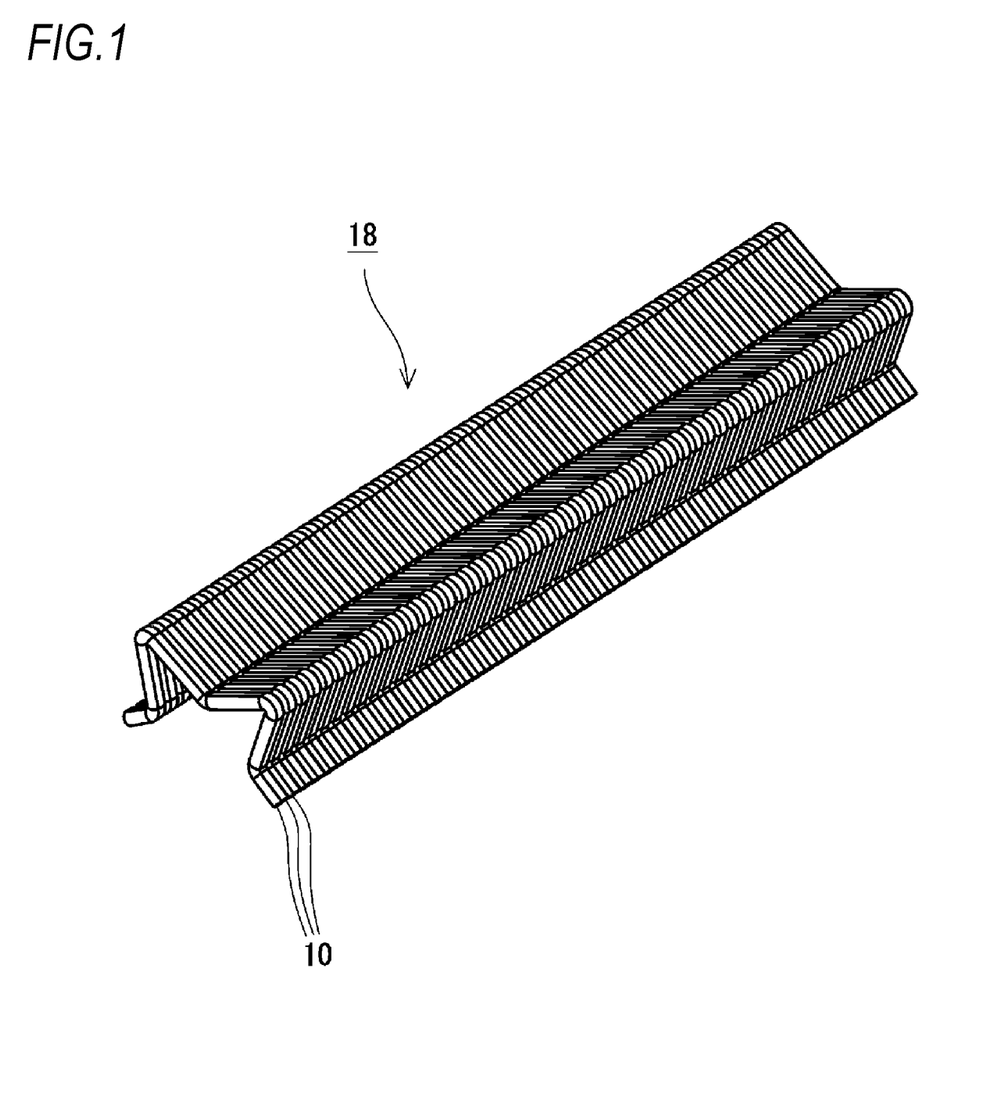
FIG. 1 is a perspective view of a connecting staple.

As shown in FIG. 1, the staple 10 is provided in a form of a connecting staple 18 where a plurality of staples 10 is connected by an adhesive, a tape or the like. When the connecting staple 18 is mounted on the induction binding machine and the induction binding machine is operated, the staple 10 is struck out one by one from an ejection port of the induction binding machine and the struck staple 10 is clinched and bent. At this time, in a case where the cord 20 is introduced on an inner side of the staple 10, the cord 20 is held by the staple 10.

Note that, in the present embodiment, although not particularly shown, the ejection port of the induction binding machine may be provided with a guide part for dividing and guiding the two cords 20 to both sides of the staple 10. That is, the guide part is provided, so that the two portions (the first end-side portion 20a and the second end-side portion 20b) on both sides of the cord 20 can be divided and guided to both sides of a mountain portion 12b, which will be described later.

Figure 3A:
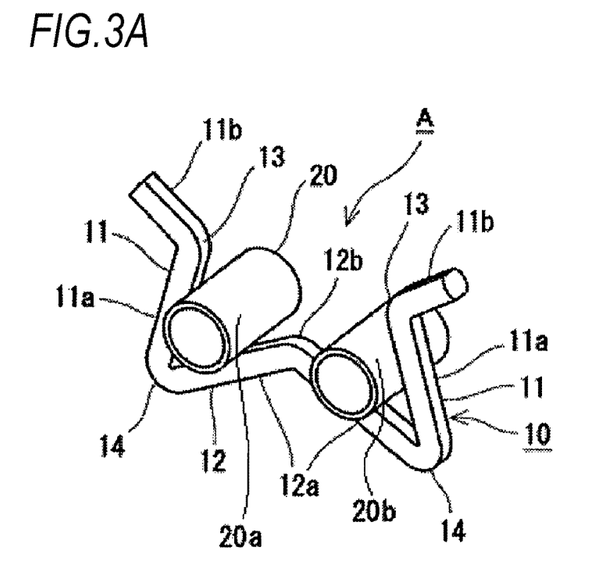
FIG. 3A is a perspective view.
Figure 3B:
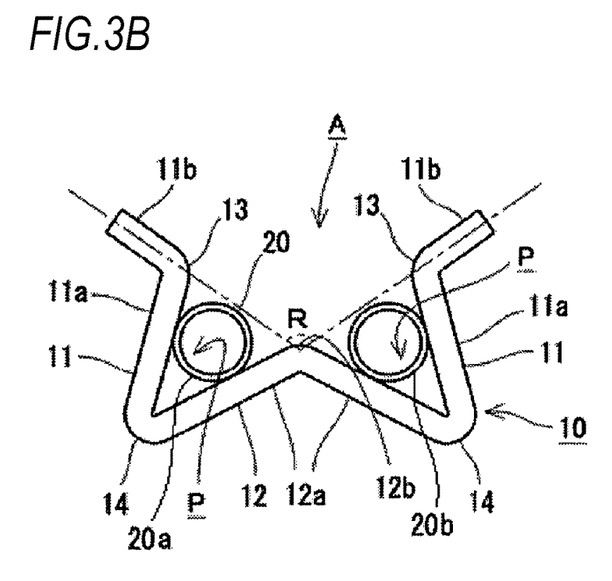
FIG. 3B is a front view and FIG. 3C is a side view.
Figure 3C:
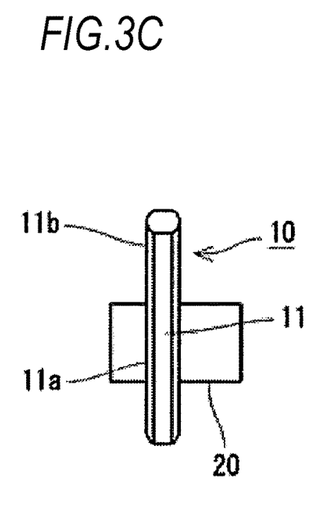

As shown in FIGS. 3A to 3C, the staple 10 of the present embodiment is a wire-shaped member formed by bending a wire rod made of metal such as iron and aluminum. The staple 10 has a pair of leg parts 11 and a crown part 12 provided between the pair of leg parts 11.

The pair of leg parts 11 is provided on both sides of the staple 10 so as to continue from both ends of the crown part 12. Each of the pair of leg parts 11 has a second holding portion 11a continuing to the crown part 12 and an introduction portion 11b continuing to the second holding portion 11a. Therefore, the pair of leg parts 11 has a pair of second holding portions 11a and a pair of introduction portions 11b.

The leg part 11 has a tip end-bent portion 13 between (connection portion) the second holding portion 11a and the introduction portion 11b. The leg part 11 has a shape bent at an obtuse angle at the tip end-bent portion 13. For this reason, the leg part 11 has a substantially inverted 'V' shape, as seen from the front.

The second holding portion 11a is a portion formed linearly and is a portion for sandwiching the cord 20 by cooperating with the crown part 12.

In addition, the introduction portion 11b is a portion provided at a tip end of the leg part 11, and is a portion for facilitating pulling of the cord 20 toward an inner side of the staple 10. In a state before clinch, the pair of introduction portions 11b is expanded toward tip end directions. The introduction portions 11b expanded in this way are provided, so that an entry of the staple 10 for introducing the cord 20 is largely widened. As a result, the cord 20 can be easily inserted to the inner side of the staple 10. In addition, the tip ends of the leg parts 11 are faced outward, so that the cord 20 is difficult to be caught at burrs of the tip ends.

Figure 7A:
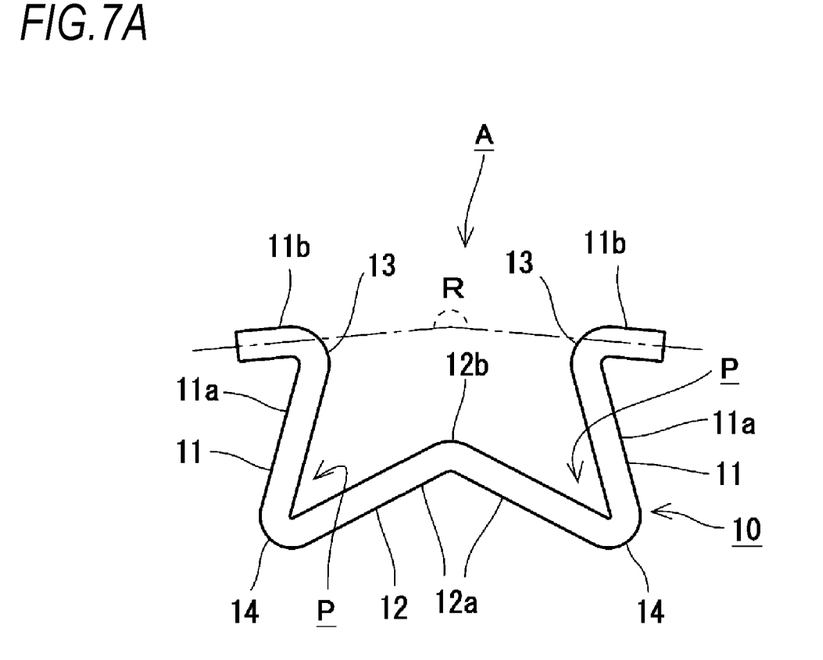
Figure 7B:
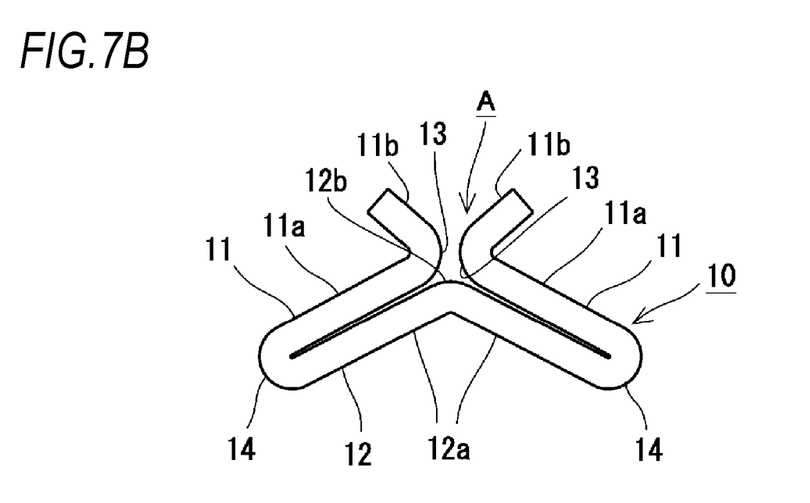

Note that, as shown in FIG. 3B, an angle R between the pair of introduction portions 11b is preferably set to a range of 0° or greater and equal to or smaller than 180°. Specifically, as shown in FIG. 7A, if the angle R between the pair of introduction portions 11b is set equal to or larger than 180°, the cord 20 moving along the introduction portions 11b is guided toward an outer side of the staple 10. As a result, the function of introducing the cord 20 to the inner side of the staple 10 is not exhibited. In addition, as shown in FIG. 7B, the introduction portions 11b are in an opened state after clinch, so that a form after binding becomes large.

Further, in the present embodiment, as shown with the dashed-dotted line in FIG. 3B, the introduction portion 11b on one side (the left side in FIG. 3B) is arranged on an extension line of the first holding portion 12a on the other side (the right side in FIG. 3B) (in other words, on the same line as the first holding portion 12a on the other side). In addition, the introduction portion 11b on the other side (the right side in FIG. 3B) is arranged on an extension line of the first holding portion 12a on one side (the left side in FIG. 3B) (in other words, on the same line as the first holding portion 12a on one side). Therefore, the extension lines of the pair of introduction portions 11b intersect at the mountain portion 12b of the crown part 12.

The crown part 12 connects the pair of leg parts 11. The crown part 12 has a pair of first holding portions 12a each continuing to each of the pair of leg parts 11 and a mountain portion 12b provided between the pair of first holding portions 12a.

The first holding portion 12a is a portion formed linearly and is a portion for sandwiching the cord 20 by cooperating with the second holding portion 11a of the leg part 11. A length of the first holding portion 12a is substantially the same as a length of the second holding portion 11a of the leg part 11.

The first holding portion 12a of the crown part 12 and the second holding portion 11a of the leg part 11 have a shape bent at an acute angle at a leg-bent portion 14, and face each other so as to sandwich the cord 20. Specifically, the leg-bent portion 14 having a shape bent at an acute angle toward an outer side of the staple 10 is provided between (connection portion) the first holding portion 12a and the second holding portion 11a.

Figure 4A:
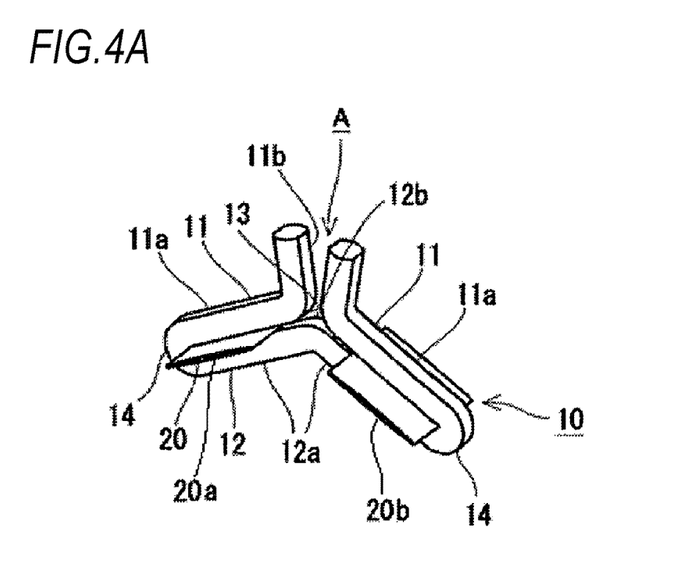
FIG. 4A is a perspective view.
Figure 4B:
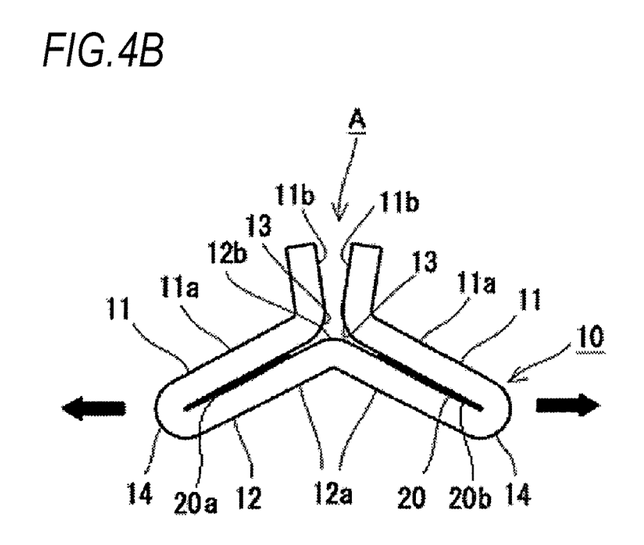
FIG. 4B is a front view and FIG. 4C is a side view.
Figure 4C:
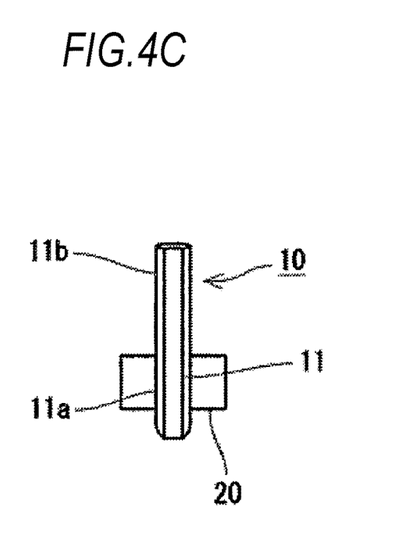

As shown in FIGS. 4A to 4C, when clinching the staple 10 for binding, the staple 10 is bent at the leg-bent portions 14. The leg-bent portion 14 is formed at an acute angle, so that it is possible to reduce an amount (angle) of bending the staple 10 and to reduce an operation amount and an operation load at the time of clinching the staple 10. In addition, since the cord 20 can be sandwiched and held by the two holding portions 11a and 12a, the cord 20 can be held crushed. In addition, since a space in which the cord 20 slides is not generated on the inner side of the leg-bent portion 14, the cord 20 can be strongly held. Particularly, in the present embodiment, the second holding portion 11a and the first holding portion 12a facing each other each have a linear portion and the cord 20 is sandwiched by the linear portions. Therefore, a space is difficult to form between the second holding portion 11a and the first holding portion 12a.

Note that, the bending R (curvature radius) on the inner side of the leg-bent portion 14 is preferably formed smaller than a diameter of the cord 20. The bending R (curvature radius) on the inner side of the leg-bent portion 14 is made small, so that a gap is difficult to form between the second holding portion 11a of the leg part 11 and the first holding portion 12a of the crown part 12 at the time of clinching. As a result, it is possible to prevent the clinched cord 20 from sliding.

In addition, the mountain portion 12b bends the middle portion of the crown part 12 so as to protrude inwardly. In other words, the mountain portion 12b bends toward the end portion directions of the leg parts 11. The mountain portion 12b is provided, so that the crown part 12 has a substantially inverted 'V' shape, as seen from the front.

The mountain portion 12b is provided so as to separate the two portions (the first end-side portion 20a and the second end-side portion 20b) on both sides of the cord 20 wound around the to-be-bound object. Specifically, as shown in FIGS. 3A to 3C, the two portions (the first end-side portion 20a and the second end-side portion 20b) on both sides of the cord 20 are divided and guided to both sides of the mountain portion 12b and are bound in this state, so that the two cords 20 on both sides (the first end-side portion 20a and the second end-side portion 20b of the cord 20) can be separately held by the staple 10. In other words, the crown part 12 is provided with a pair of pockets P for holding the cord 20, on left and right sides of the mountain portion 12b.

The pocket P is provided between the second holding portion 11a and the first holding portion 12a facing each other. More specifically, the pocket P is provided in a region surrounded by the extension line (the dashed-dotted line in FIG. 3B) of the introduction portion 12b, the second holding portion 11a and the first holding portion 12a. In a cross-sectional view (FIG. 3B), sizes of the pockets P are preferably set so that the two cords 20 on both sides (the first end-side portion 20a and the second end-side portion 20b of the cord 20) do not protrude outward beyond the pockets P.

By such setting, the staple 10 securely holds the first end-side portion 20a and the second end-side portion 20b of the cord 20.

Figure 6A:
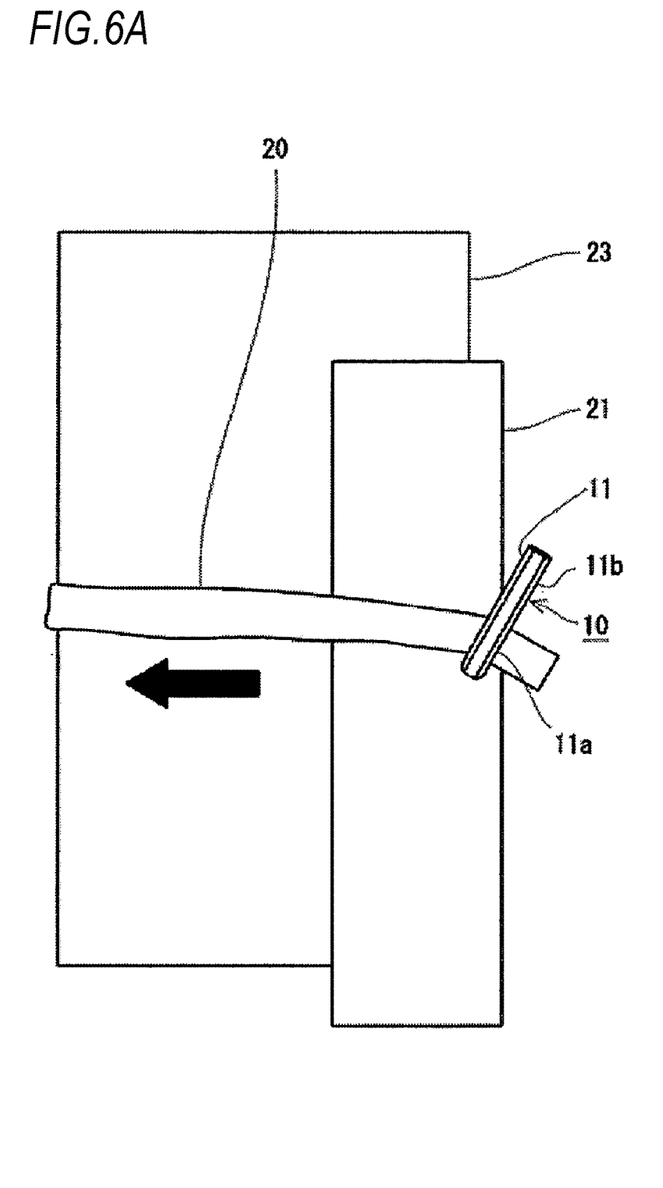
FIG. 6A is a side view.

Further, the mountain portion 12b is provided to the crown part 12, so that the cord 20 can be stably held even after binding. Specifically, as shown in FIG. 6A, the to-be-bound object is caused to follow the mountain portion 12b, so that the staple is tilted and the bound state can be stabilized.

Figure 6B:
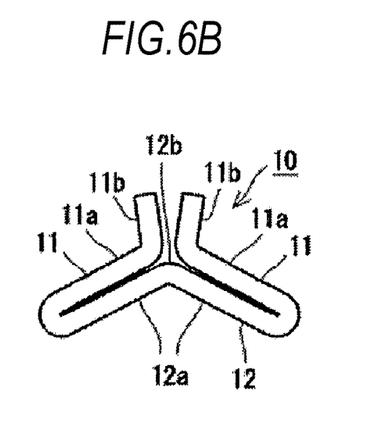
FIG. 6B is a front view of only the staple.

Specifically, as seen in the upper and lower direction shown in FIGS. 6A and 6B, since the staple 10 holds the cord 20 below the mountain portion 12b, when a force (refer to a leftward arrow in FIG. 6A) of pulling out the cord 20 from the staple 10 is applied, a lower part below the mountain portion 12b is pulled. At this time, since the staple 10 contacts the to-be-bound object (the support post 21, in the case of FIG. 6A) at the mountain portion 12b, the lower part is pulled, so that the staple rotates about the mountain portion 12b as a fulcrum and is thus obliquely tilted with respect to the cord 20 pulled as shown in FIG. 6A and the to-be-bound object. When the staple 10 is tilted in this way and the cord 20 is thus bent, a friction force between the staple 10 and the cord 20 further increases. As a result, the cord 20 is difficult to slide on the inner side of the staple 10, so that the holding force increases.

Note that, the mountain portion 12b is preferably at a right angle or an obtuse angle, and more preferably in a range of 90° to 130°. The mountain portion 12b is at such angle, so that the staple 10 after binding is resistant to deformation and it is also easy to obtain the effect resulting from the tilting of the staple 10.

In addition, since the pockets P for holding the cord 20 are formed on both sides of the staple 10 and a pocket exit A is provided between the pockets P on both sides, even when the cord 20 is pulled toward both the left and right sides (arrow direction in FIG. 4B), the cord 20 moves while deviating in an opposite direction to the pocket exit A. Therefore, when the force of removing the cord 20 is applied, a force (refer to the arrow in FIG. 4B) of intending to open the closed staple 10 is difficult to act, so that the staple 10 can stably hold the cord 20.

Note that, in a staple 100 of the related art as shown in FIGS. 9A to 9C, when the cord 20 is pulled, a force (refer to the arrow in FIG. 9B) of intending to open the closed staple 100 acts, so that the staple 10 is opened and the force of holding the cord 20 may be reduced. However, according to the present embodiment, since the staple 10 is difficult to open, the staple can stably hold the cord 20.

As described above, the staple 10 of the present embodiment has the crown part 12 between the pair of leg parts 11, and the crown part 12 is formed with the mountain portion 12b bent inwardly. According to this configuration, when binding the cord 20 with the staple 10, it is possible to divide and bind the two portions (the first end-side portion 20a and the second end-side portion 20b) on both sides of the cord 20 on both sides of the mountain portion 12b. In this way, since the two cords 20 can be separated from each other and an appropriate load can be applied to the cords 20 by each of the leg parts 11 of the staple 10, positions of the two cords 20 become stable and the held cords 20 can be strongly held.

In addition, in order to sandwich the cord 20, the second holding portion 11a of the leg part 11 and the first holding portion 12a of the crown part 12 are provided to face each other. According to this configuration, it is possible to sandwich and hold the cord 20 by the second holding portion 11a and the first holding portion 12a. When the cord 20 is sandwiched by the second holding portion 11a and the first holding portion 12a, a gap is difficult to form between the leg part 11 and the crown part 12 after clinch, so that the held cord 20 can be strongly held.

Further, the tip ends of the leg parts 11 are provided with the introduction portions 11b that are expanded toward the tip end directions. According to this configuration, when pulling the cord 20 toward the inner side of the staple 10, it is possible to facilitate the pulling by using the introduction portions 11b. In addition, in the staple 100 of the related art as shown in FIGS. 9A to 9C, since the tip ends of the staple 10 are faced inwardly at the time of holding the cord 20, the cord 20 may be damaged due to burrs or the like of the tip ends of the staple 10 and the cord 20 may be disconnected therefrom. Regarding this, according to the present embodiment, since the introduction portions 11b are faced outwardly, there is no concern that the held cord 20 is damaged.

Figure 8A:
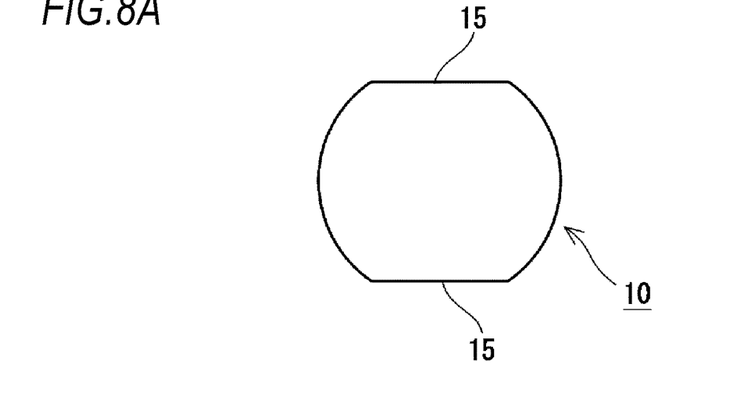
FIG. 8A is a cross-sectional view of the staple.
Figure 8B:
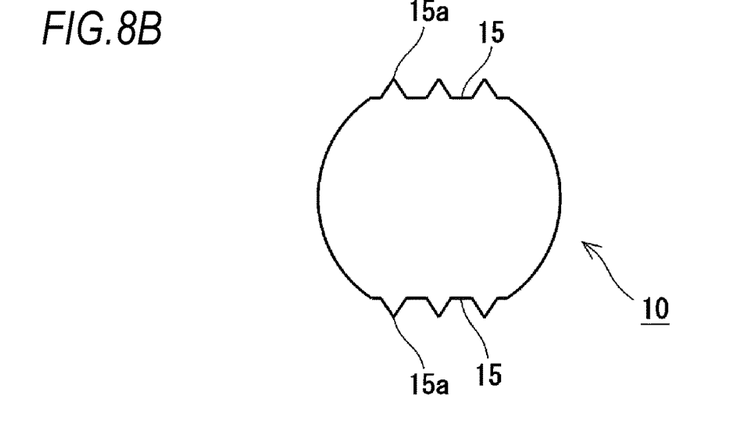
FIG. 8B is a cross-sectional view of a staple according to a first modified embodiment.

Note that, the staple 10 of the above embodiment is formed using a wire rod having a section as shown in FIG. 8A. Specifically, the staple has a sectional shape that looks like a crushed circle as shown in FIG. 8A, and when clinching the staple 10, the cord 20 is sandwiched by flat surfaces 15 facing each other. In this way, the cord 20 is sandwiched by the surfaces, so that a contact area can be widened to increase the friction, thereby enhancing the holding force. However, the sectional shape of the staple 10 is not limited thereto. For example, as shown in FIG. 8B, an unevenness shape 15a may be provided to further improve the holding force.

Figure 8C:
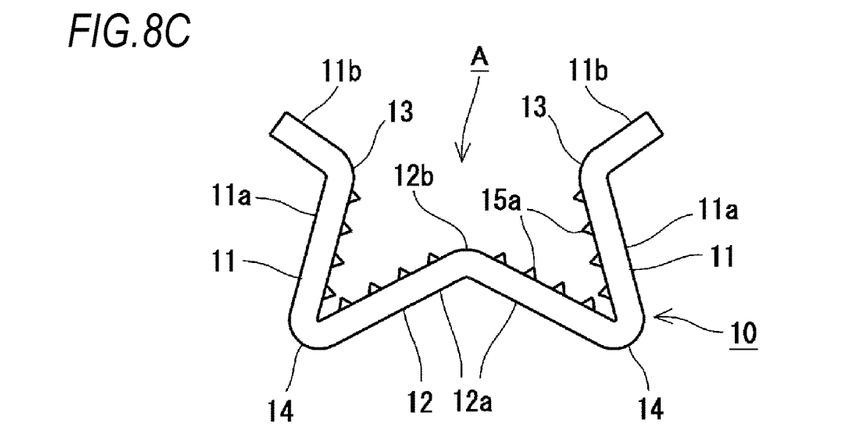
FIG. 8C is a front view of a staple according to a second modified embodiment.

In addition, as shown in FIG. 8C, the unevenness shape 15a may be provided along a length direction of the wire rod to further improve the holding force.

Of course, the staple 10 may also be formed using a wire rod having a circular section without providing the flat surface 15 or the unevenness shape 15a.

In addition, in the above embodiment, the second holding portion 11a and the first holding portion 12a have been described as linearly extending. However, the present invention is not limited thereto. For example, one or both of the second holding portion 11a and the first holding portion 12a may be formed in a curved shape.

Further, in the above embodiment, the case where the leg-bent portion 14 is at an acute angle has been described. However, the present invention is not limited thereto. For example, the leg-bent portion 14 may be at a right angle or an obtuse angle.

Further, in the above embodiment, the mountain portion 12b is formed by bending the middle portion of the crown part 12 so as to protrude inwardly. However, the shape of the mountain portion 12b described in the embodiment is just exemplary, and other shapes can also be adopted. For example, the mountain portion 12b may be formed by denting the middle of the crown part 12.

Further, the mountain portion 12b may be provided so that the middle portion of the crown part 12 is inwardly curved, instead of bending the middle portion of the crown part 12 so as to protrude inwardly. In this case, the curved mountain portion 12b is provided, so that the crown part 12 has a substantially inverted 'U' shape, as seen from the front.

The present application is based on Japanese Patent Application No. 2019-073949 filed on Apr. 9, 2019, the contents of which are incorporated herein by reference.

REFERENCE SIGNS LIST

10: staple
11: leg part
11a: second holding portion

11*b*: introduction portion
12: crown part
12*a*: first holding portion
12*b*: mountain portion
13: tip end-bent portion
14: leg-bent portion
15: flat surface
15*a*: unevenness shape
18: connecting staple
20: cord
20*a*: first end-side portion
20*b*: second end-side portion
21: support post (to-be-bound object)
22: wire (to-be-bound object)
23: branch (to-be-bound object)
100: staple of the related art
P: pocket
A: pocket exit
R: angle

The invention claimed is:

1. A staple for holding and binding two portions on both sides of a cord wound around a to-be-bound object, the staple comprising:
    a pair of leg parts, and
    a crown part connecting the pair of leg parts,
    wherein the crown part has first holding portions each continuing to each of the pair of leg parts and formed linearly, and a mountain portion provided between the first holding portions and bent so as to protrude inwardly,
    wherein the pair of leg parts has second holding portions continuing from both ends of the crown part and formed linearly, and introduction portions continuing to the second holding portions and expanded toward tip end directions,
    wherein leg-bent portions are each provided between the first holding portions and the second holding portions, and
    wherein the first holding portions and the second holding portions have a shape bent at an acute angle at the leg-bent portions to face each other.

2. The staple according to claim 1, wherein tip ends of the leg parts are provided with the introduction portions that are expanded toward tip end directions.

3. The staple according to claim 1, wherein the mountain portion is formed by bending a middle portion of the crown part at a right angle or an obtuse angle.

4. The staple according to claim 1, wherein the mountain portion is formed by bending a middle portion of the crown part at an angle of 90° to 130°.

5. The staple according to claim 1, wherein the crown part has a pair of the first holding portions,
    wherein each of the pair of leg parts has the second holding portion,
    wherein the pair of the first holding portions of the crown part connects the mountain portion of the crown part and the pair of leg parts, and
    wherein the second holding portions of the pair of leg parts continue to the pair of the first holding portions of the crown part.

6. The staple according to claim 1, wherein a curvature radius on an inner side of each of the leg-bent portions is smaller than a diameter of the cord.

7. The staple according to claim 1, wherein each of the pair of leg parts has the introduction portion, and
    wherein an angle between the introduction portion on one side and the introduction portion on the other side does not exceed 180°.

8. The staple according to claim 1, wherein the crown part has a pair of the first holding portions,
    wherein each of the pair of leg parts has the second holding portion,
    wherein the pair of the first holding portions of the crown part connects the mountain portion of the crown part and the pair of leg parts,
    wherein the second holding portions of the pair of leg parts continue to the pair of the first holding portions of the crown part,
    wherein tip ends of the leg parts are provided with introduction portions that are expanded toward tip end directions, and
    wherein a tip end-bent portion bent at an obtuse angle toward an inner side is provided between the second holding portion and the introduction portion.

9. A connecting staple having a plurality of the staples connected to each other according to claim 1.

* * * * *